Patented Dec. 25, 1951

2,579,755

UNITED STATES PATENT OFFICE 2,579,755

PROCESS FOR PRODUCING AN ETHYL CELLULOSE HOT-MELT COMPOSITION

George H. Pyle, Hopewell, Va., and John S. Tinsley, Wilmington, Del., assignors to Hercules Powder Company, Wilmington, Del., a corporation of Delaware No Drawing. Application December 24, 1947, Serial No. 793,760

6 Claims. (Cl. 106—181)

This invention relates to a method for increasing the color stability of ethyl cellulose hot-melt coating compositions when subjected to elevated temperatures.

The preparation of ethyl cellulose hot-melt compositions requires temperatures ranging from about 150 to about 200° C. At these temperatures unstabilized hot melts show degradation by virtue of both a viscosity breakdown and a darkening in color, thus rendering them unsuitable for many uses. Similar effects have been noted when coatings or films of such compositions are subjected to heat.

Recently, it has been found possible to prevent all or most of the viscosity degradation by incorporating stabilizers such as diphenylamine, Belro phenol lactone, syringic acid, menthylphenol, etc., in small quantities in the hot-melt composition. These stabilizers, however, generally do not prevent discoloration in the presence of heat. In fact, some stabilizers of this type even contribute color to the hot melt.

Various attempts to improve the color stability of ethyl cellulose compositions by treatment with various stabilizing agents have not met with much success in ethyl cellulose hot-melt compositions. In cases where color development has been less than that obtained where no stabilizers were used, the extent of color improvement has been insufficient to satisfy the increasingly higher requirements for good color in such compositions.

The object of this invention is a process for producing an ethyl cellulose coating composition having improved color stability which has increased resistance to color degradation at the elevated temperatures normally encountered in the preparation of such hot-melt compositions and which can be formed into coatings or films having increased resistance to discoloration by heat.

It has been discovered in accordance with this invention that ethyl cellulose hot-melt compositions having greatly improved color stability in the presence of heat may be prepared by incorporating with the composition from about 1.0% to about 10.0%, based on the weight of ethyl cellulose, of a lower alkyl ester of oxalic acid containing less than 6 carbon atoms in the alkyl groups. This material may be added to the ethyl cellulose in any suitable manner or to the composition during preparation thereof. Compositions containing such materials may be compounded in the usual way by mixing and heating at elevated temperatures without substantial discoloration and then applied in the form of paper coatings, strippable protective coatings, etc., having increased resistance to color degradation by heat.

The following examples will serve to illustrate specific embodiments of the invention but are not to be construed as limiting the invention. Example I illustrates the stabilizing effect of diethyl and dibutyl oxalates in ethyl cellulose hot-melt paper coatings in comparison with a composition containing no color stabilizer. Example II illustrates the stabilizing effect of these materials in ethyl cellulose hot-melt strippable coatings. All parts are by weight unless otherwise specified.

EXAMPLE I

Each of the compositions shown in Table I below were prepared by mixing and heating all the ingredients, except the ethyl cellulose, to a temperature of about 200° C., then adding the ethyl cellulose while stirring, and continuing the heating and stirring until complete solution was effected, the maximum temperature reached being about 200° C. The compositions were then cooled to a temperature of about 175° C. and coated on paper.

The coated papers were then heated in an oven for 44 hours at a temperature of 170° C. Color of coatings before and after heating were determined and are set forth in Table I. Colors were measured on the spectrophotometer, and values are expressed as luminous transmittance, trichromatic coefficient X, and excitation purity. These values are fully defined in the "Handbook of Colorimetry," by A. C. Hardy, M. I. T. Press, Cambridge, Mass., 1936.

Table I

EVALUATION OF COLOR STABILIZERS IN ETHYL CELLULOSE HOT-MELT PAPER COATINGS

|  | 1 | 2 | 3 | 4 | 5 |
|---|---|---|---|---|---|
| Ethyl Cellulose (46.8 to 48.5 ethoxyl, 14 centipoises viscosity) | 20 | 20 | 20 | 20 | 20 |
| Glycerol Ester of Hydrogenated Rosin | 45 | 45 | 45 | 45 | 45 |
| Carnauba Wax | 6 | 6 | 6 | 6 | 6 |
| Paraffin (45° C.) | 8 | 8 | 8 | 8 | 8 |
| Fractol | 6 | 6 | 6 | 6 | 6 |
| Opalwax | 15 | 15 | 15 | 15 | 15 |
| Menthylphenol | 1 | 1 | 1 | 1 | 1 |
| Diethyl Oxalate |  | 1 |  | 1.5 | 2.0 |
| Dibutyl Oxalate |  |  | 1 |  |  |
| Luminous Reflectance: |  |  |  |  |  |
| Original per cent | 78.6 | 78.8 | 79.1 | 79.3 | 79.6 |
| After 44 hrs. at 170° C. per cent | 73.0 | 77.8 | 77.1 | 77.6 | 78.0 |
| Trichromatic Coefficient X: |  |  |  |  |  |
| Original | .3221 | .3214 | .3213 | .3225 | .3208 |
| After 44 hrs. at 170° C. | .3366 | .3261 | .3252 | .3261 | .3241 |
| Excitation Purity: |  |  |  |  |  |
| Original per cent | 6.9 | 6.4 | 6.4 | 7.2 | 6.1 |
| After 44 hrs. at 170° C. per cent | 15.5 | 9.5 | 8.9 | 9.4 | 8.2 |

These data show that formulation number 1 which contains no color stabilizer darkens considerably when heated to 170° C. for 44 hours. This is indicated by the decrease in luminous reflectance, and the increase in trichromatic coefficient X and percent excitation purity. All of the compositions stabilized with the oxalic acid esters showed considerably better color after heating than the unstabilized composition.

EXAMPLE II

Each of the compositions shown in Table II were compounded as in Example I. Portions of the compositions were then coated on polished steel, allowed to set, and then stripped therefrom in the form of films about 80 mils in thickness. The remaining portions of the compositions were then heated for 48 hours at 190° C. and likewise cast into films. Color measurements were taken on the two sets of films and are set forth in Table II. Colors were measured on the spectrophotometer, and values are expressed as luminous transmittance and trichromatic coefficient X.

Table II
EVALUATION OF COLOR STABILIZERS IN ETHYL CELLULOSE HOT-MELT STRIPPABLE COATINGS

|  | 1 | 2 | 3 |
|---|---|---|---|
| Ethyl Cellulose (46.8 to 48.5 ethoxyl, 22 centipoises viscosity) | 30 | 30 | 30 |
| Low Molecular Weight Polymer of a Mixture of Styrene and Styrene Homologue | 20 | 20 | 20 |
| Glycerol Ester of Hydrogenated Rosin | 25 | 25 | 25 |
| L-1 White Oil (Mineral Oil) | 25 | 25 | 25 |
| Paraffin Wax | 3 | 3 | 3 |
| Menthylphenol | 1 | 1 | 1 |
| Diethyl Oxalate |  | 1 |  |
| Dibutyl Oxalate |  |  | 1 |
| Luminous Transmittance: |  |  |  |
| Original _____ per cent | 65.1 | 71.7 | 73.5 |
| After 48 hrs. at 190° C _____ do | 29.0 | 53.4 | 51.9 |
| Trichromatic Coefficient X: |  |  |  |
| Original | .3594 | .3494 | .3587 |
| After 48 hrs. at 190° C | .5261 | .4330 | .4440 |

Here again the data show a distinct improvement in color stability of ethyl cellulose hot-melt strippable coatings when diethyl and dibutyl oxalate are used as color stabilizers. This is brought out by the percent luminous transmittance and trichromatic coefficient X figures for formulations 2 and 3 as compared to formulation 1.

The essential ingredients of the ethyl cellulose hot-melt compositions in accordance with the present invention are ethyl cellulose and a lower alkyl ester of oxalic acid. Other ingredients desirably included are plasticizers, resins, waxes and viscosity stabilizers.

The ethyl cellulose found useful in the hot-melt compositions of the present invention will have an ethoxyl content from about 43.5% to about 50.0% and preferably from about 46.8% to about 48.5%. Viscosity types ranging from about 14 centipoises to about 50 centipoises are preferred, although lower and higher viscosity types of from about 7 centipoises to about 200 centipoises may be used. The viscosities indicated are those of a 5% by weight solution of ethyl cellulose in a solvent mixture consisting of 80% toluene and 20% ethyl alcohol by weight at 25° C.

The particular materials found useful as color stabilizers for ethyl cellulose hot-melt compositions in accordance with the present invention are the lower alkyl esters of oxalic acid containing less than 6 carbon atoms in the alkyl groups. These will include dimethyl oxalate, diethyl oxalate, dipropyl oxalate, dibutyl oxalate and diamyl oxalate.

The subject oxalates are effective stabilizers in amounts varying from about 1.0% to about 10% of the weight of the ethyl cellulose. Preferably they will be employed in amounts between about 3.0% and about 5%, 3% usually being the optimum quantity to obtain satisfactory stability and other required characteristics. Larger amounts than about 10% produce no substantial additional stabilizing effect, while amounts below about 1.0% usually do not create the desired degree of stabilization.

Any suitable plasticizer compatible with the ethyl cellulose may be used in compositions prepared in accordance with the present invention. Organic phosphates such as trioctyl phosphate; phthalates such as dibutyl, diamyl, dioctyl and diphenyl phthalate; higher fatty acids; higher fatty alcohols; higher fatty acid esters; vegetable and mineral oils are among the types of plasticizers which may be used. These may be included singly or in various combinations. The amount of plasticizer to be used will depend on the particular formulation and the results desired. In general, amounts up to about 100% of the weight of ethyl cellulose may be used in order to obtain the desired result.

Thermoplastic resins which are compatible with the ethyl cellulose may also be used. These should have low acid numbers to avoid any degrading influence on the ethyl cellulose at the elevated temperatures used in compounding and applying the composition. Resins which are particularly suitable are the glycerol, pentaerythritol, or higher polyhydric alcohol esters of rosin, hydrogenated rosin, polymerized rosin or heat-treated rosin, alkyd resins modified with any of the above rosins, oil-modified alkyds, maleic-modified rosin-polyhydric alcohol esters, phenol-formaldehyde resins modified with any of the above rosins, 100% phenolic resins, coumarone-indene resins, etc. These may be included in amounts up to about 350% of the weight of ethyl cellulose.

Additional ingredients may include waxes and viscosity stabilizers. Suitable waxes are paraffin, microcrystalline petroleum waxes, carnauba wax, candelilla wax, montan wax, and japan wax. Suitable viscosity stabilizing agents may include menthylphenol, diphenylamine, phenyl beta naphthylamine, carbazole, diphenylguanidine, sym. dibeta-naphthyl paraphenylene diamine, hydroquinone monobenzyl ether, hydroquinone monobutyl ether, hydroquinone monoamyl ether, copper salts such as copper naphthenate, cupric chloride, cupric acetate, etc. The amount of stabilizer included in the composition will preferably be no more than the amount required to provide the desired stability against viscosity degradation and will not exceed about 10% of the weight of ethyl cellulose. Waxes may be included in amounts up to about 250% of the weight of ethyl cellulose.

The ingredients of the ethyl cellulose compositions defined hereinabove may be compounded together by a hot-melt method involving stirring of the ingredients together while heating until a uniform composition is provided. Alternatively, the ingredients may be compounded by milling on hot rolls or in internal mixers of the Banbury type. In employing the hot-melt method temperatures of about 150° C. up to about 200° C. are desirable, while in the case of the milling method the temperature of the heated rolls may be from about 135° C. to about 160° C. to provide plastic compositions of good uniformity. Other methods of compounding the ingredients may be used if desired.

Any suitable method of application, such as spraying, dipping, knife coating, etc., may be used in applying the ethyl cellulose hot-melt compositions of the present invention to the objects to be coated. The amount of composition which is allowed to remain on the article should be sufficient to provide an impervious coating of the desired thickness. In general the thickness of the coating will vary from about 0.3 mil to about 2.0 mils for paper coatings and up to about 100 mils for strippable coatings.

The temperature of application may be any temperature at which the composition is in a fluid condition, and may be from about 125° C. to about 200° C., depending on the composition, the method of coating used, and the article to be coated. Where possible, it is desirable to heat the article itself before applying the composition, since by this means the amount of composition retained on the article will be reduced to a minimum and the coating operation facilitated.

The ethyl cellulose compositions according to the present invention are characterized by improved resistance to color degradation caused by heat. Thus, these compositions can be compounded at elevated temperatures of 150° C. to 200° C. without the formation of dark color as normally encountered with ethyl cellulose compositions containing no color stabilizer. Films and coatings made from such compositions likewise show increased resistance to color formation caused by heat. The color-stable compositions of the present invention are particularly suitable and useful as hot-melt paper coatings and as strippable plastic coatings for various articles such as machine parts, etc.

Viscosities given throughout this specification are defined in terms of centipoises as determined on 5% solutions of the cellulose ether in 80:20 toluene : ethyl-alcohol at 25° C.

What we claim and desire to protect by Letters Patent is:

1. In the process for producing a thermoplastic ethyl cellulose hot-melt composition by heating to elevated temperature to compound the composition by melting whereby color degradation is caused during the compounding, the steps to improve color which consist in adding to the composition prior to compounding by melting from about 1% to about 10%, based on the ethyl cellulose, of a lower dialkyl ester of oxalic acid containing less than 6 carbon atoms in the alkyl groups, and thereafter compounding the composition in the presence of said lower dialkyl ester of oxalic acid by melting and mixing at an elevated temperature between about 135° C. and about 200° C. to obtain a fluid hot-melt composition resistant to color degradation by heat.

2. A process according to claim 1 in which the lower dialkyl ester of oxalic acid is dimethyl oxalate.

3. A process according to claim 1 in which the lower dialkyl ester of oxalic acid is diethyl oxalate.

4. A process according to claim 1 in which the lower dialkyl ester of oxalic acid is dipropyl oxalate.

5. A process according to claim 1 in which the lower dialkyl ester of oxalic acid is dibutyl oxalate.

6. A process according to claim 1 in which the lower dialkyl ester of oxalic acid is diamyl oxalate.

GEORGE H. PYLE.
JOHN S. TINSLEY.

REFERENCES CITED

The following references are of record in the file of this patent:

UNITED STATES PATENTS

| Number | Name | Date |
|---|---|---|
| 738,533 | Eichengrun et al. | Sept. 8, 1903 |
| 1,309,980 | Clarke | July 15, 1919 |
| 1,671,788 | Sincere | June 6, 1922 |
| 2,264,316 | Kauppi | Dec. 2, 1941 |
| 2,297,709 | Kauppi | Oct. 6, 1942 |
| 2,383,361 | Bass et al. | Aug. 21, 1943 |
| 2,387,773 | Salo et al. | Oct. 30, 1945 |
| 2,453,214 | Figdor | Nov. 9, 1948 |
| 2,510,177 | Horback | June 6, 1950 |